Figure 1:
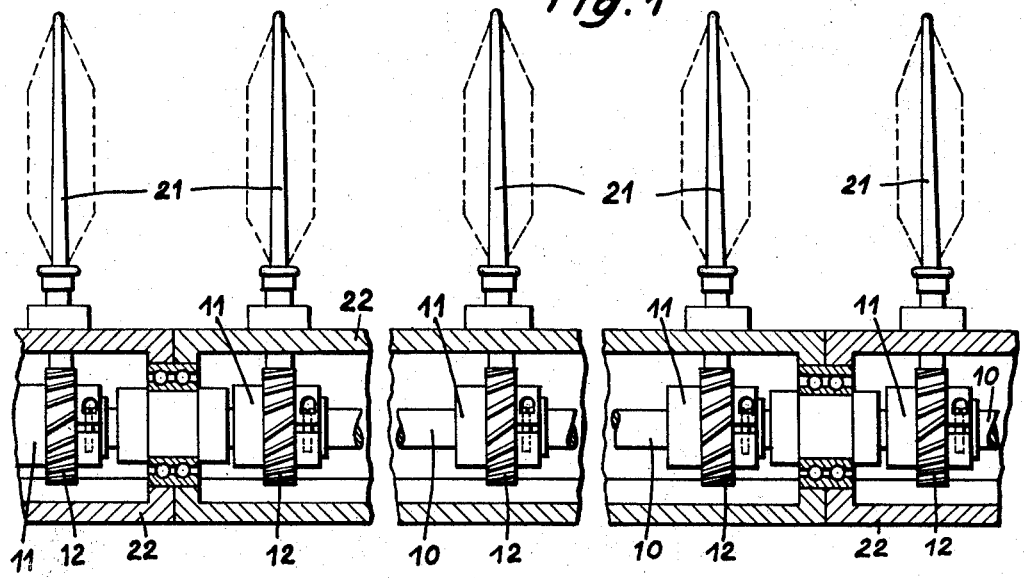

Dec. 23, 1930.  J. J. KEYSER  1,786,348

SPINNING AND TWISTING MACHINE

Filed June 10, 1930

INVENTOR
Johann J. Keyser
BY
ATTORNEYS

Patented Dec. 23, 1930

1,786,348

UNITED STATES PATENT OFFICE

JOHANN JACOB KEYSER, OF AARAU, SWITZERLAND

SPINNING AND TWISTING MACHINE

Application filed June 10, 1930, Serial No. 460,198, and in Germany June 21, 1929.

This invention is concerned with certain improvements of spinning, twisting and the like textile machinery, having a plurality of gear actuated spindles being operated by a common driving shaft and adapted each to be manually arrested by the grip of the operator's hand while the common driving shaft and all of the other spindles driven thereby continue to rotate. According to my invention I interpose between each spindle actuating gear and the common driving shaft a centrifugal clutch or coupling, which while adapted to be in a permanent frictional engagement with a driving element, so as to start the rotation of the spindle upon actuation of the driving shaft or, when the driving shaft is already revolving, upon release of the grip of the operator's hand and to permit the speeding up of the released spindle so as to bring it into a satisfactory frictional grip with the spindle actuating gear, yet can not be put under such centrifugal force and frictional bite, as to be dragged along if the operator's hand is gripping the spindle in order to temporarily stop or arrest it.

Prior to my present invention it has been customary to connect the driving shaft and the actuating gears of the spindles of spinning, twisting and the like machines driven thereby by coupling or clutching members which were arranged at the driving element. If in such instance coupling jaws are used which are acted upon by centrifugal power or by springs the actuated element will permanently bear very heavily on the spindle actuating gear, even if a spindle is arrested and subsequently restarted that the spindle actuating gear which normally is manufactured from fibre board or any other antinoise substance, is worn out after little time and will therefore cause a non-uniform running of the spindle.

According to my present invention I so connect the driving shaft of spinning, twisting and the like machines with the spindle actuating gears commonly driven thereby by centrifugal clutch or coupling jaws that the same can be arrested by a grip or braking of the spindles without exerting any detrimental or objectionable reaction on the common actuating shaft. I employ this mechanism mainly for the purpose of eliminating the centrifugal force of the coupling jaws during the standstill or spindle stopping periods while maintaining a small coupling friction or dragging grip by the spring bias of the coupling jaws in order to permit the start of the spindle actuating gears when the spindles are released.

According then to my invention the centrifugal coupling jaws are arranged on the driven element of the clutches or couplings, that is on the actuating gears of the spindles. For the obtaining a sufficiently large starting moment at the start of the common actuating shaft, or, after the start thereof, upon release of a formerly arrested spindle, the jaws are besides kept by springs in contact with an actuating disc so that immediately at the beginning of the rotation of a spindle actuating gear the centrifugal force of the coupling elements may start its action and slowly increase up to its full effect. Upon a spindle being arrested, for example by manual grip, while the common driving shaft continues to rotate, the peripheral speed of its actuating gear slows down at once and the centrifugal power of the coupling jaws carried by it becomes smaller so that also the coupling grip or effect slows down and, if the spindle is arrested and the actuating gear will be stationary, the friction of the coupling jaws will again have its initial or smallest value.

In the drawing illustrating a preferred embodiment of my invention.

Figure 2:
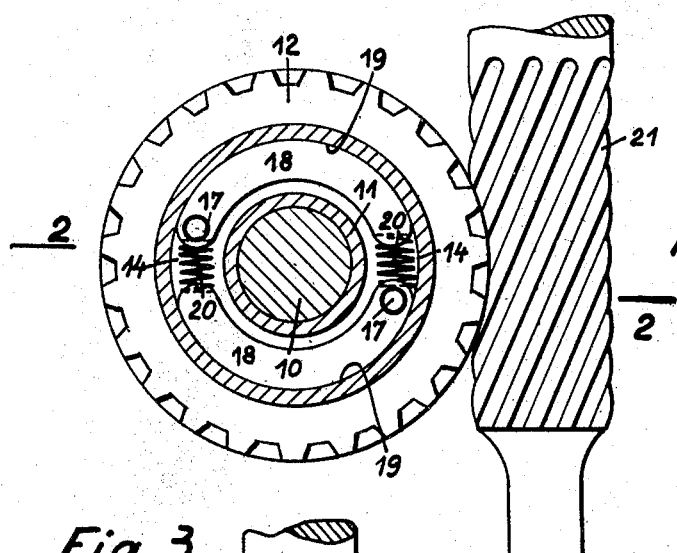
Figure 3:
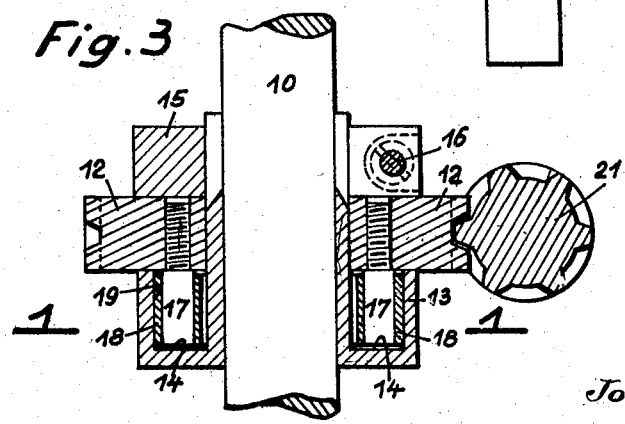

Fig. 1 illustrates part of the spindle beam of a spinning machine constructed according to my invention and being partly shown in central section, Fig. 2 is a front view of an individual spindle actuating mechanism embodying my invention drawn on an enlarged scale and in section along the line 1—1 of Fig. 3, Fig. 3 is a section along line 2—2 of Fig. 2.

In the drawing I have shown in Fig. 1 part of a spindle beam of a spinning machine, comprising, as usually, a plurality of spindles 21 supported in the beam casing 22 and actuated from a common longitudinal driving shaft 10 by the intermediary of worm gears 12. These worm gears must be loosely connected or coupled with shaft 10 in order that the spindles can individually be arrested or stopped, while shaft 10 and all of the other spindles are continuing to rotate, as this is well known to those familiar with this particular art.

In accordance with my invention I interpose between the common driving shaft and the spindles actuating gears driven thereby coupling mechanisms comprising a sleeve 11 slid upon and revolving with the driving shaft 10 and on which a spindle actuating worm gear 12 is loosely mounted. The same bears with its one end against a ring or flange 13 forming part of the sleeve 11 and constituting a ring chamber 14 therewith. At its other side the worm gear is guided by a clamping ring 15 which by means of a clamping screw 16 is pressed on a slotted portion of sleeve 11 so as to firmly clamp the same on the shaft 10.

The worm gear 12 is provided with two threaded studs or pins 17, arranged parallel with the axis of shaft 10 and projecting into the chamber 14. Centrifugal coupling jaws 18 are pivotally mounted on the said pins 17 and bear with their outer surfaces 19 against the inner wall of ring 13. Instead of attaching the studs 17 at the gear 12 the same may also be fixed at the coupling jaws 18 and loosely engage with non-threaded recesses of the worm gear 12, as will be readily understood. Between the pivot ends of a jaw 18 and the free end of the adjacent jaw 18 I arrange springs 20 imparting respectively an outward bias to both coupling jaws 18. It will of course be understood that instead of the two coupling jaws 18 illustrated I may also employ any other suitable number of coupling jaws.

The new spindle coupling mechanism is operating as follows:

Upon the machine being started all the worm gears 12 are on account of the slight friction grip existing between the quickly rotating ring 13 and the spring-biased jaws 18 rotated with a successively increasing speed or acceleration, the jaws at the first beginning of the operation being dragged to some extent over the inner surface of ring 13, so that the spindle actuating gear is caused to revolve with an at first comparatively low speed. As soon however as the worm gears 12 begin at all to rotate the centrifugal force of the coupling jaws revolving with them will slowly increase so that the said jaws get a more and more firm or positive hold of the sleeve 13 and impart to the worm gears 12 very soon their full rotational speed at the exclusion of any further relative or frictional rotation between members 12 and 13.

If a spindle is to be arrested while the main operating shaft 10 continues to rotate the operator grasps simply with his hand the spindle with a manual force sufficient to overcome the clutching friction or bite between the members 13 and 18, so that again a more or less dragging action or differential relative rotation is caused between the said members whereby the numbers of revolutions of the worm gear and accordingly the centrifugal grip of the coupling jaws 18 are automatically reduced. When the worm gear 12 will thereafter be finally arrested or prevented from rotation it is only the small friction effect produced by the springs 20 which still exists, but which in the absence of any increase due to centrifugal action can not overcome the stopping or braking effect exerted upon the spindle, such friction being just sufficient to cause upon release of the spindle the initial rotation of the worm gear and to thereby reinitiate the centrifugal action of the coupling jaws 18.

What I claim is:

1. In a spindle beam a hollow longitudinal beam casing, a plurality of spaced rotatable spindles carried thereby, a common actuating shaft for the said spindles and a plurality of operative connections between the actuating shaft and the spindles, each connection comprising a gear loosely mounted on the actuating shaft and meshing with a spindle actuating element, a cylindrical hollow sleeve fixedly mounted on the actuating shaft and centrifugal coupling means carried by the said loosely mounted gear and adapted to frictionally engage with the said hollow sleeve so as to establish a fixed connection therewith and to rotate the said spindle actuating gear when the common actuating shaft is rotated.

2. In a spindle beam a hollow longitudinal beam casing, a plurality of spaced rotatable spindles carried thereby, a common actuating shaft for the said spindles and a plurality of operative connections between the actuating shaft and the spindles, each connection comprising a gear loosely mounted on the actuating shaft and meshing with a spindle actuating element, a cylindrical hollow sleeve fixedly mounted on the actuating shaft, and bearing on the said hollow sleeve coupling jaws on the loosely mounted gear in sliding engagement with the said hollow sleeve under centrifugal action, when the actuating shaft is rotated, and means for permanently pressing the said coupling jaws against the said hollow sleeve so that the same may initiate rotation of the said loosely mounted gear and increase under the increasing centrifugal pressure of the coupling jaws, the rotational speed thereof, until a fixed relation exists between the spindle and the actuating shaft, permitting however slip between them and a reduction of the centrifugal coupling action, when a spindle is arrested while the actuating shaft continues to rotate.

3. In a spindle beam a hollow longitudinal beam casing, a plurality of spaced rotatable spindles carried thereby, a common actuating shaft for the said spindles and a plurality of operative connections between the actuating shaft and the spindles, each connection comprising a gear loosely mounted on the actuating shaft and meshing with a spindle actuating element, a cylindrical hollow sleeve fixedly mounted on the actuating shaft, and centrifugal coupling jaws carried by the said loosely mounted gear and being in a permanent frictional engagement with the said hollow sleeve, so that the said gear may be rotated by the said actuating shaft with a frictional grip establishing a fixed relation between the said shaft and the said loosely mounted gear while permitting a relative slip between them when the shaft begins to rotate or when the actuating spindle is arrested during the continuance of the shaft rotation.

4. In a spindle beam a hollow longitudinal beam casing, a plurality of spaced rotatable spindles carried thereby, a common actuating shaft for the said spindles and a plurality of operative connections between the actuating shaft and the spindles, each connection comprising a gear loosely mounted on the actuating shaft and meshing with a spindle actuating element, a cylindrical hollow sleeve fixedly mounted on the actuating shaft and centrifugal coupling means, carried by the said loosely mounted gear and being in such a permanent frictional engagement with the said hollow sleeve, that the said loosely mounted gear may be started for rotation by the said sleeve, when the actuating shaft is rotated, and be kept in a fixed slip relation therewith upon increase of the speed rotation of the loosely mounted gear.

5. In a spindle beam a hollow longitudinal beam casing, a plurality of spaced rotatable spindles carried thereby, a common actuating shaft for the said spindles and a plurality of operative connections between the actuating shaft and the spindles, each connection comprising a gear loosely mounted on the actuating shaft and meshing with a spindle actuating element, a cylindrical hollow sleeve fixedly mounted on the actuating shaft, centrifugal coupling means carried by the said loosely mounted gear and adapted to frictionally engage with the said hollow sleeve so as to establish a fixed connection therewith and to rotate the said spindle actuating gear when the common actuating shaft is rotated, and springs biasing the said coupling means into frictional engagement with the said hollow sleeve.

In testimony whereof I affix my signature.

JOHANN JACOB KEYSER.